United States Patent
Reyna et al.

(10) Patent No.: US 7,207,031 B2
(45) Date of Patent: Apr. 17, 2007

(54) SYSTEM AND METHOD FOR UTILIZATION OF A COMMAND STRUCTURE REPRESENTATION

(75) Inventors: David Reyna, San Francisco, CA (US); Shawn-Lin Dzeng, San Francisco, CA (US); Lee Cheng, Walnut Creek, CA (US)

(73) Assignee: Wind River Systems, Inc., Alameda, CA (US)

( * ) Notice: Subject to any disclaimer, the term of this patent is extended or adjusted under 35 U.S.C. 154(b) by 644 days.

(21) Appl. No.: 09/845,414

(22) Filed: Apr. 30, 2001

(65) Prior Publication Data
US 2003/0033589 A1 Feb. 13, 2003

Related U.S. Application Data

(63) Continuation-in-part of application No. 09/797,106, filed on Mar. 1, 2001, and a continuation-in-part of application No. 09/797,122, filed on Mar. 1, 2001.

(51) Int. Cl.
*G06F 9/45* (2006.01)
(52) U.S. Cl. .................................................. 717/105
(58) Field of Classification Search ............... 717/137, 717/159, 105
See application file for complete search history.

(56) References Cited

U.S. PATENT DOCUMENTS

| | | | |
|---|---|---|---|
| 4,613,946 A | 9/1986 | Forman | 345/116 |
| 4,821,211 A | 4/1989 | Torres | 345/85 |
| 5,262,761 A | 11/1993 | Scandura et al. | 345/581 |
| 5,448,740 A * | 9/1995 | Kiri et al. | 717/155 |
| 5,546,522 A | 8/1996 | Nishida et al. | 345/810 |
| 5,600,778 A * | 2/1997 | Swanson et al. | 345/762 |
| 5,600,789 A * | 2/1997 | Parker et al. | 714/38 |
| 5,644,736 A | 7/1997 | Healy et al. | 345/784 |
| 5,649,100 A | 7/1997 | Ertel et al. | 709/225 |
| 5,652,876 A * | 7/1997 | Ashe et al. | 703/26 |
| 5,715,463 A * | 2/1998 | Merkin | 717/175 |
| 5,742,762 A | 4/1998 | Scholl et al. | 709/200 |
| 5,754,939 A * | 5/1998 | Herz et al. | 455/3.04 |
| 5,815,703 A | 9/1998 | Copeland et al. | 707/102 |
| 5,857,093 A * | 1/1999 | Bradford | 703/21 |
| 5,860,010 A | 1/1999 | Attal | 717/137 |
| 5,864,865 A | 1/1999 | Lakis | 707/103 R |
| 5,870,545 A | 2/1999 | Davis et al. | 709/201 |
| 5,901,286 A | 5/1999 | Danknick et al. | 709/203 |
| 5,909,550 A | 6/1999 | Shankar et al. | 709/227 |
| 5,913,052 A * | 6/1999 | Beatty et al. | 703/15 |
| 5,931,917 A | 8/1999 | Nguyen et al. | 709/250 |
| 5,966,536 A * | 10/1999 | Ravichandran | 717/153 |
| 5,977,967 A * | 11/1999 | Berner et al. | 345/826 |
| 5,987,513 A | 11/1999 | Prithviraj et al. | 709/223 |
| 5,996,010 A | 11/1999 | Leong et al. | 709/223 |

(Continued)

*Primary Examiner*—John Chavis
(74) *Attorney, Agent, or Firm*—Fay Kaplun & Marcin, LLP

(57) ABSTRACT

A method for generating a list of desired elements of a first software code, the first code having a predefined command structure; extracting the desired elements from the first code; and performing an operation on the extracted elements. A system includes a first engine which receives a list of desired elements of a first software code, the first code having a predefined command structure; a second engine which extracts the desired elements from the first code; and a third engine which performs an operation on the extracted elements.

17 Claims, 14 Drawing Sheets

U.S. PATENT DOCUMENTS

| | | | |
|---|---|---|---|
| 5,999,948 A | 12/1999 | Nelson et al. | 715/506 |
| 6,002,867 A * | 12/1999 | Jazdzewski | 717/105 |
| 6,003,077 A | 12/1999 | Bawden et al. | 709/223 |
| 6,009,274 A | 12/1999 | Fletcher et al. | 717/173 |
| 6,028,602 A | 2/2000 | Weidenfeller et al. | 345/781 |
| 6,029,195 A * | 2/2000 | Herz | 725/116 |
| 6,044,218 A | 3/2000 | Faustini | 717/107 |
| 6,049,819 A | 4/2000 | Buckle et al. | 709/202 |
| 6,054,983 A | 4/2000 | Simonoff et al. | 345/738 |
| 6,141,792 A | 10/2000 | Acker et al. | 717/116 |
| 6,182,275 B1 * | 1/2001 | Beelitz et al. | 717/175 |
| 6,493,868 B1 * | 12/2002 | DaSilva et al. | 717/105 |
| 6,587,995 B1 * | 7/2003 | Duboc et al. | 716/4 |
| 6,605,770 B2 * | 8/2003 | Yamane et al. | 84/609 |
| 2001/0037412 A1 * | 11/2001 | Miloushev et al. | 709/315 |
| 2001/0054008 A1 * | 12/2001 | Miller et al. | 705/26 |
| 2002/0099530 A1 * | 7/2002 | Foltinek | 703/22 |
| 2002/0178434 A1 * | 11/2002 | Fox et al. | 717/106 |
| 2003/0092434 A1 * | 5/2003 | Irisawa | 455/418 |

* cited by examiner

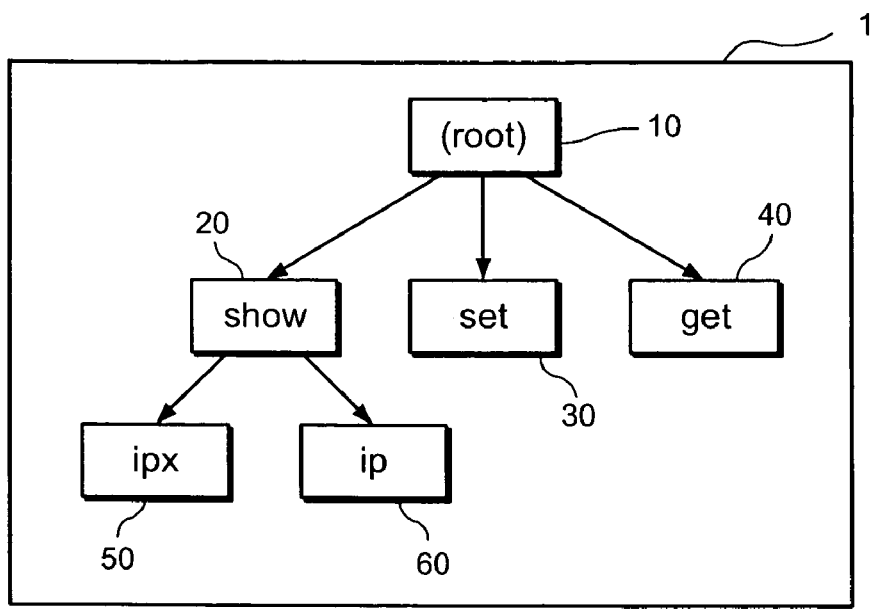
F I G. 1
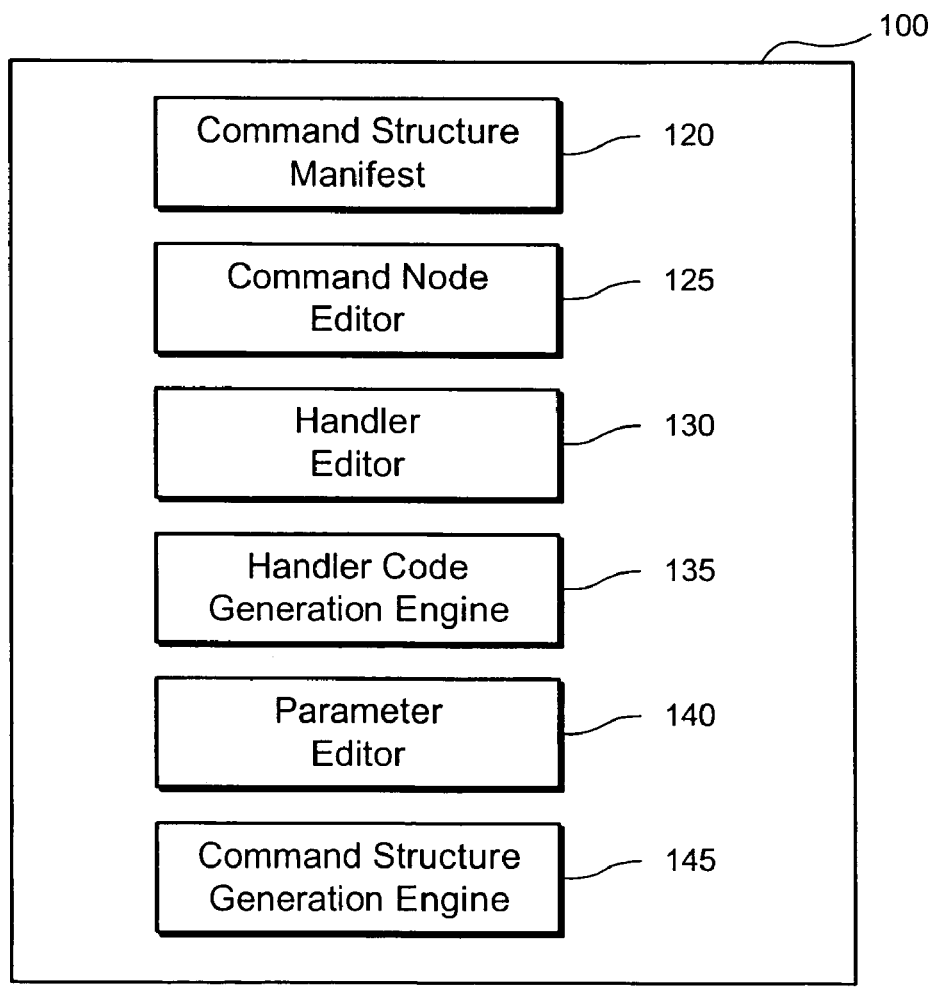
F I G. 2

FIG. 11

```
Edit Handler Custom Code
New Custom Code
extern RLSTATUS
VD_Command3Handler(cli_env *pCliEnv, paramList *pParams, sbyte *AuxBuf)
{
    RLSTATUS:  status = OK;
    sbyte      *pVal1;
    paramDescr *pParamDescri;

/* get required parameter */
    status - RCC_DB_RetrieveParam (pParams, NULL, mCommand3_NULL1,
    ipParamDesc
    if ( OK ! + status )
    { ( return: status );
    } clse pVal1 = (sbyte*) (pParamDescr1 - *pValue);

RCC_EXT_WriteStr (pCliEnv, kCommand3MsgRequiredValue);
    RCC_EXT_WriteStrLine (pCliEnv, pVal1);

/* get optional parameter */
    if ( OK = = RCC_DB_RetrieveParam (pParams, NULL, mCommand3_NULL2,
    ipParamDesc
    {   pVal2 = (sbyte*) (pParamDescr2 - *pValue);
        RCC_EXT_WriteStr (pCliEnv, kCommand3MsgOptionalValue);
        RCC_EXT_WriteStrLine (pCliEnv, pVal2);
```

Close  Cancel  Clear  Revert

600

Note: to insert a TAB caracter press CTRL + TAB

```
<command_node keyword = "loadrun"
 help= "- load or execute from tftp or ROM"
 mode_support- " false" prompt_string= "indicate a file name"
 access_level- "0"  allow_no_form = "false">
  <parameter_list>
    <pd  keyword = "file"  type ="string"  bitmask = "0x00000001" />
  </parameter_list>
  <handler_list>
    <hd  type ="0"
     reg_param_mask = "0x00000000"
     opt_param_mask = "0x00000001"
     func = "RLI_Craft_Reload_B"  />
  </handler_list>
  <command_node_list>
  </command_node_list>
</command_node_list>
```

FIG. 12

Command "Loadrun"
----------------------
The keyword is                                      : "loadrun"
The prompt is                                       : "Indicate a file name"
The help string is                                  : "- load or execute from tftp or ROM
The access level is                                 : 0
The mode support flag is                            : False
The no form flag is                                 : False This command uses the following parameter:
    The keyword is                                  : "file"
    The type is                                     : string
    The bitmask is                                  : 0x00000001

This command uses the following phandler:
    The function name is                            : RLI_Craft_Reload_B
    The required mask is                            : 0x00000000
    The optional mask is                            : 0x00000001
    The handler type is                             : 0

F I G. 13

SYSTEM AND METHOD FOR UTILIZATION OF A COMMAND STRUCTURE REPRESENTATION

INCORPORATION BY REFERENCE

This application is a continuation-in-part of U.S. patent application Ser. No. 09/797,106, entitled "System and Method for a Command Structure Representation" filed on Mar. 1, 2001, naming inventors Lee Chang and Shawn-Lin Dzeng. In addition, this application is a continuation-in-part of U.S. patent application Ser. No. 09/797,122, entitled "System and Method for Automatic Software Code Generation", filed on Mar. 1, 2001 and naming inventors Lee Chang and Shawn-Lin Dzeng. Both of these filed U.S. patent applications are assigned to the Assignee of the present application and expressly incorporated herein, in their entirety, by reference. Furthermore, the benefit of the filing date of the above-referenced prior applications under 35 U.S.C. §120 is claimed.

BACKGROUND INFORMATION

The command line interface (sometimes also referred to as a command shell or simply a "shell") is a common interface for computer operating systems (e.g., DOS, UNIX, etc.). A user enters commands on the command line one line after another and the operating system executes the commands in the order of entry. The operating system does not distinguish a command from a program. Commands and programs are run after the user has typed the name of the command or program and pressed the "Enter" key. The pressing of the "Enter" key signals to the system that the user has finished entering the text and it may begin running the command. For example, the user may type "Command0" in the command line interface and then press the "Enter" key. In this case, the pressing of the "Enter" key signals to the operating system that it should execute the "Command0" command.

In the case of the operating systems described above (e.g., DOS, UNIX), there is a standard set of commands included with the operating system. However, software developers may desire to add additional commands to this standard set while other software developers may be developing completely new operating systems which do not have any commands. These new operating systems may be, for example, for embedded devices (i.e., any device that may be networked with another electronic device). Examples of embedded devices include wireless telephones, PDAs, home appliances, office products, networking equipment, factory automation products, automotive components, security devices, etc. These operating system developers generally use a software development suite to build the new operating system including a command line interface and accompanying commands.

Despite the importance of the command line interface, it is often one of the most poorly engineered aspects of device architectures. Commands are often designed and implemented in a quick and dirty fashion merely to test a newly developed feature. This development scheme does not lend itself to an architecture that is both efficient at run-time and easy to modify and extend. Also, elements of the command line interface are often "hard coded" directly into the application. A lack of an abstract representation precludes utilization of modeling tools (e.g., GUIs) and other automated or semi-automated operations (e.g., a translation of natural language text, generation of a documentation, etc.)

SUMMARY OF THE INVENTION

The present invention is directed to a method for utilization of a command structure representation of data file/codes. In particular, the present invention relates to a method for generating a list of desired elements of a first software code, the first code having a predefined command structure; extracting the desired elements from the first code; and performing an operation on the extracted elements. In addition, the present invention relates to a system includes a first engine which receives a list of desired elements of a first software code, the first code having a predefined command structure; a second engine which extracts the desired elements from the first code; and a third engine which performs an operation on the extracted elements.

BRIEF DESCRIPTION OF DRAWINGS

FIG. 1 shows an exemplary command tree according to the present invention;

FIG. 2 shows an exemplary architecture having functions for creating and editing command nodes according to the present invention;

FIG. 11 shows an exemplary graphical user interface for the handler code generation engine according to the present invention;

FIG. 12 shows an exemplary graphical user interface which includes a single command node in XML language format;

FIG. 13 shows an exemplary graphical user interface which includes an output file generated based on the command node shown in FIG. 12 utilizing a method according to the present invention;

DETAILED DESCRIPTION

Figure 3:
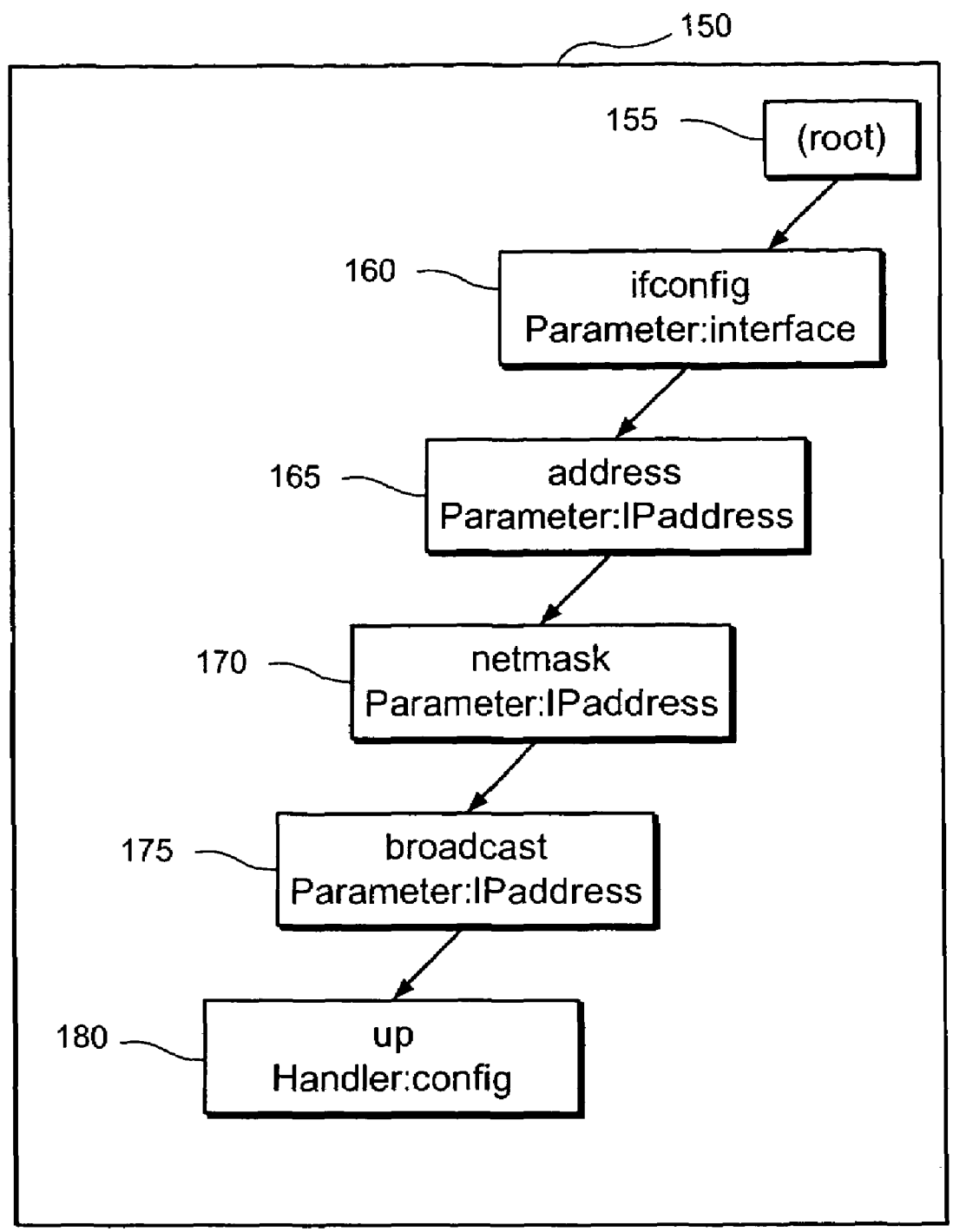
FIG. 3 shows an exemplary command tree branch having command nodes according to the present invention.

The present invention may be further understood with reference to the following description of preferred exemplary embodiments and the related appended drawings, wherein like elements are provided with the same reference numerals. Throughout this specification the terms command and command node may be used interchangeably. Additionally, the exemplary embodiments of the present invention will be discussed with reference to embedded devices and the accompanying operating systems. However, those skilled in the art will understand that the present invention is not limited to embedded systems, and may be used with any operating system that supports a Command Line Interface ("CLI"). Additionally, the term developer is generally used throughout this description to describe the individual responsible for developing the operating system (e.g., adding new commands, editing existing commands, etc.) The term user is generally used to describe the individual that may be using the operating system (e.g., entering commands in the CLI for the operating system to execute). However, the terms may be used interchangeably throughout this description. For example, the term user may also describe the individual responsible for developing the operating system.

FIG. 1 shows an exemplary command data structure, such as exemplary command tree 1 having command nodes 10–60. Command tree 1 is a hierarchical representation of the commands available to the user of the operating system. All of the command nodes lead back to root node 10 where the traversing of the structure begins each time a user enters a command in the CLI. In exemplary command tree 1, root node 10 has three child command nodes, show node 20, set node 30 and get node 40. Additionally, show node 20 has two child command nodes, ipx node 50 and ip node 60. When a user enters a command on the CLI, the operating system parses the command and determines the appropriate action to take. For example, if the user types in the command "show ip" and presses the "Enter" key, the operating system will first parse the command into its constituent parts (e.g., "show" and "ip"). The operating system will then traverse command tree 1 until it reaches the appropriate leaf of the tree. In this example, the operating system will first reach show node 20 and then ip node 60. A handler function, which will be described in greater detail below, associated with show node 20 and ip node 60 will be called and the appropriate output will be sent back to the user. Those skilled in the art will understand that command tree 1 may have numerous command nodes that are nested to multiple levels. Exemplary command tree 1 has three levels of nesting: the first level contains root node 10; the second level contains show node 20, set node 30, and get node 40; and the third level contains ipx node 50 and ip node 60. However, it may be possible to go to much deeper levels of nesting by adding additional command nodes that are children, grandchildren, etc. to the existing command nodes. For example, adding child command nodes and grandchild command nodes to ip node 60 would result in nesting of command tree 1 to a fifth level. This may result in multiple branches on command tree 1, but all these branches will still start at root node 10.

Command nodes 10–60 may be stored in a database which may include information on a particular command node 10–60 such as a keyword or name, a help string, a prompt string, the access level, "no form" capabilities, the number of child nodes, pointers to the child nodes, a number of parameters associated with the command node, pointers to the parameter descriptions, the number of handler functions, pointers to the handler functions, etc. Thus, when a developer is defining a new command there may be a multitude of pieces of information the developer may include about the new command in order for that command to be properly inserted within the command structure. The exemplary embodiment of the present invention allows the developer to quickly create CLI commands by creating the structure of command nodes. Each command node may, in turn, be edited to add parameters and handler functions. The exemplary embodiment of the present invention also allows for the automatic generation of software code for the handler functions and provides for the modification of the generated code.

FIG. 2 shows exemplary architecture 100 having functions 110–140 for creating and editing command nodes. Command structure manifest 110 enables a developer to visually manipulate the command structure by adding and deleting command nodes at any level. Command node editor 120 allows the developer to create and edit command nodes including the ability to add parameters and handler functions, modify help strings and set security levels. Handler editor 130 allows the developer to create and edit skeletons for handler functions which may be associated with command nodes including the association of parameters with particular handler functions. Handler code generation engine 135 accepts the data entered by the developer about a handler function and converts it to a source file containing the skeletal versions for the handler function. Parameter editor 140 allows the developer to edit parameters for command nodes including the name and variable type of the parameter. Command structure generation engine 145 accepts the data entered by the developer in the other functions and converts it into a file describing the full command set specified by the developer. The file may contain the static initialized command node structures, the static initialized parameter definitions and the static initialized handler definitions. Operation of each of functions 110–145 will be described in greater detail below.

FIG. 3 shows exemplary command tree branch 150 having command nodes 155–180. Those of skill in the art will understand that exemplary command tree branch 150 may be part of a larger command structure. Exemplary command tree branch 150 may correspond to the exemplary command:

ifconfig eth0 address 1.2.3.4 netmask 255.0.0.0 broadcast 1.255.255.255 up

In this case, the exemplary command would be parsed in the following manner: ifconfig node 160, address node 165, netmask node 170, broadcast node 175 and up node 180. Each of command nodes 155–180 has either an associated handler function or an associated parameter. Ifconfig node 160 has an associated parameter named interface, which in the exemplary command above is "eth0". "eth0" may refer, for example, to an Ethernet connection as the type of interface typed in combination with this command. Address node 165 has an associated parameter named IP address, which in the exemplary command above is "1.2.3.4." Netmask node 170 also has an associated parameter named IP address, which in the exemplary command above is "255.0.0.0." Broadcast node 175 also has an associated parameter named IP address, which in the exemplary command above is "1.255.255.255." When each of command nodes 165–175 is invoked, the user inputs an IP address as the parameter for these commands. Up node 180 has an associated handler function named "config." The handler function has associated software code. Executing this software code causes the operating system to carry out the particular command typed by the user in the CLI. Thus, when the user types in the exemplary command described above and presses the "Enter" key, the operating system parses the command into its constituent parts and traverses command tree branch 150. When the operating system reaches up node 180, the operating system retrieves the appropriate handler function (e.g., "config") and executes the software code associated with the handler function using the parameters entered by the user, resulting in the complete execution of the command.

Figure 4:
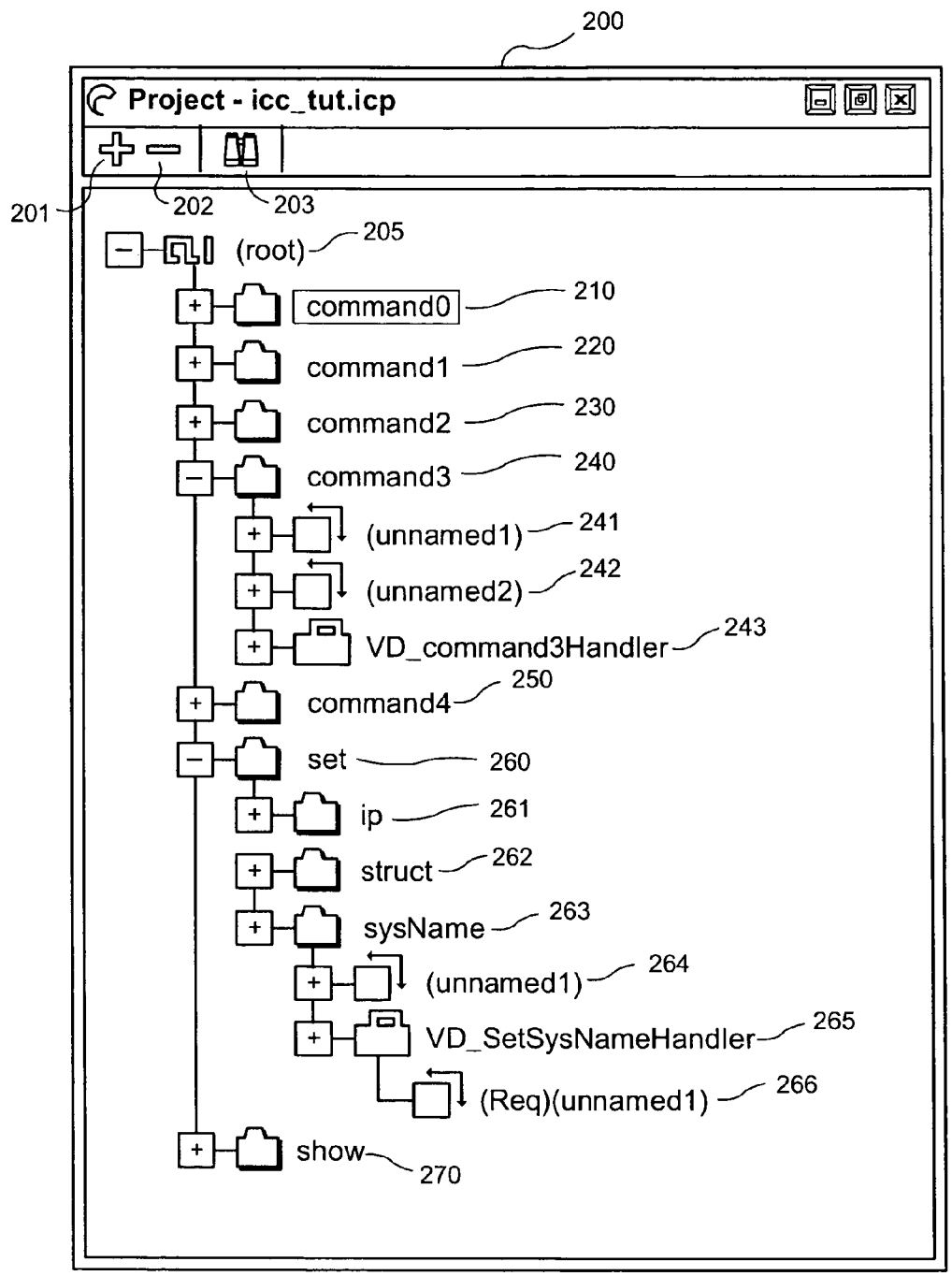
FIG. 4 shows an exemplary graphical user interface for the command tree manifest according to the present invention.

FIG. 4 shows an exemplary command graphical user interface ("GUI") 200 for command structure manifest 110 described with respect to FIG. 2. Command structure manifest 110 enables a developer to visually manipulate the command structure by adding and deleting command nodes at any level. The process of adding and deleting command nodes will be described in greater detail below. The following is a description of GUI 200 which shows commands that have already been created for a particular operating system. GUI 200 shows these command nodes in a hierarchical arrangement. The command structure has root node 205 which has seven children command nodes: command0 node 210, command1 node 220, command2 node 230, command3 node 240, command4 node 250, set node 260, and show node 270. GUI 200 indicates that these seven command nodes 210–270 are children of root node 205 by showing them below and on the first level of offset from root node 205. Referring to set node 260, GUI 200 indicates that there are three child command nodes (i.e., ip node 261, struct node 262 and sysname node 263) for set node 260. Once again, GUI 200 indicates that command nodes 261–263 are children of set node 260 by showing them below and on the first level of offset from set node 260. Additionally, GUI 200 also shows parameters and handler functions associated with each command node. For example, command3 node 240 has two associated parameters, unnamed1 parameter 241 and unnamed2 parameter 242 and handler function VD_Command3Handler 243. It should be clear that parameters 241–242 and handler function 243 are associated with command3 node 240 because they are situated directly underneath and in the first level of offset from command3 node 240. GUI 200 also distinguishes between command nodes, parameters and handler functions by showing, at the start of the name for each entry, an icon that is unique for that entries classification—i.e., command node, parameter or handler function. For example, command3 node 240 has a different icon than unnamed1 parameter 241, while VD_Command3Handler 243 is preceded by a third icon. However, command0 node 210 has the same icon as command3 node 240, indicating they are both command nodes.

Figure 5:
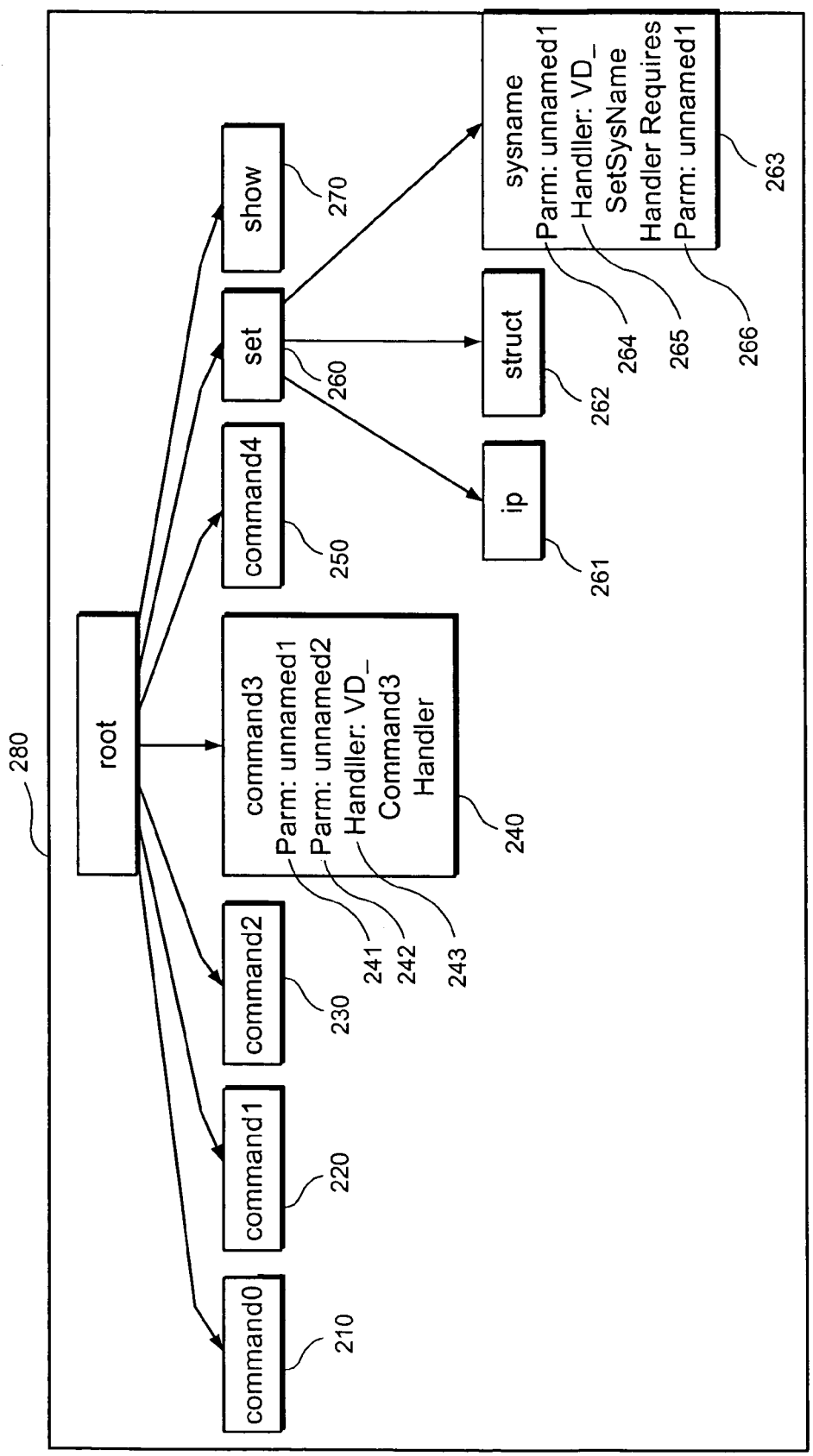
FIG. 5 shows an exemplary command tree representation of the commands shown on the graphical user interface of FIG. 4.

FIG. 5 shows an exemplary command tree representation 280 of the commands shown on GUI 200 of FIG. 4. As described above, root node 205 is the command node from which the other command nodes branch. The seven child command nodes 210–270 are shown directly under and connected to root node 205. Child command nodes 261–263 of set node 260 are shown directly under and connected to set node 260. Those command nodes which have associated parameters and/or handler functions are shown as included in the command node. For example, command3 node 240 is shown containing the two associated parameters, unnamed1 parameter 241 and unnamed2 parameter 242 and handler function VD_Command3Handler 243.

Figure 6:
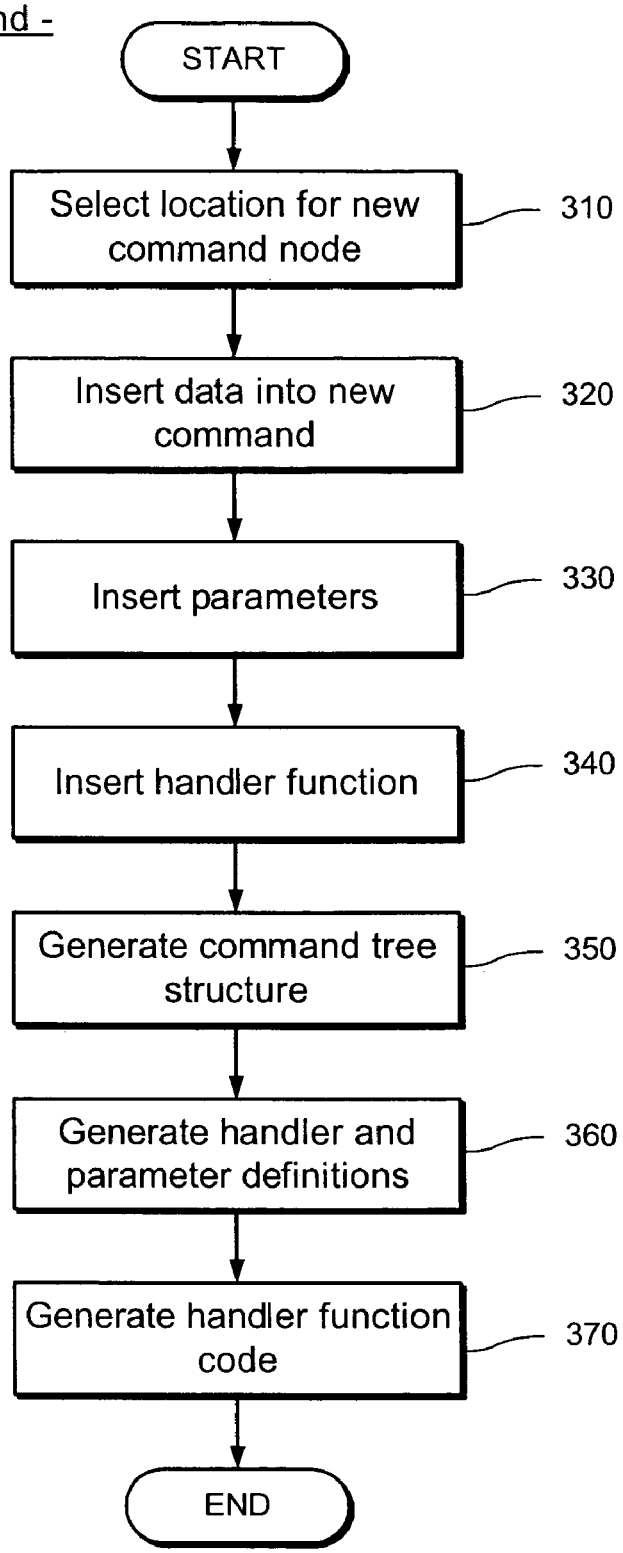
FIG. 6 shows an exemplary process for adding a command node to a command tree according to the present invention.

FIG. 6 shows an exemplary process 300 for adding a command node to a command structure. In step 310, the developer selects the location in the command structure to insert the new command node. For example, referring back to FIG. 4, if the developer were inserting command0 node 210, the developer would highlight root node 205 and click on "+" button 201 on GUI 200 or simply double click on root node 205. This selection indicates that the developer desires to add a command node that is a child of root node 205. Similarly, if the developer were inserting ip node 261, the developer would highlight set node 260 and click on "+" button 201 on GUI 200 or simply double click on set node 260, indicating the desire to add a command node that is a child of set node 260. After the developer has selected the location for the new command node, the process continues to step 320 where the developer enters the command node editor 120 and provides information about the new command node.

Figure 7:
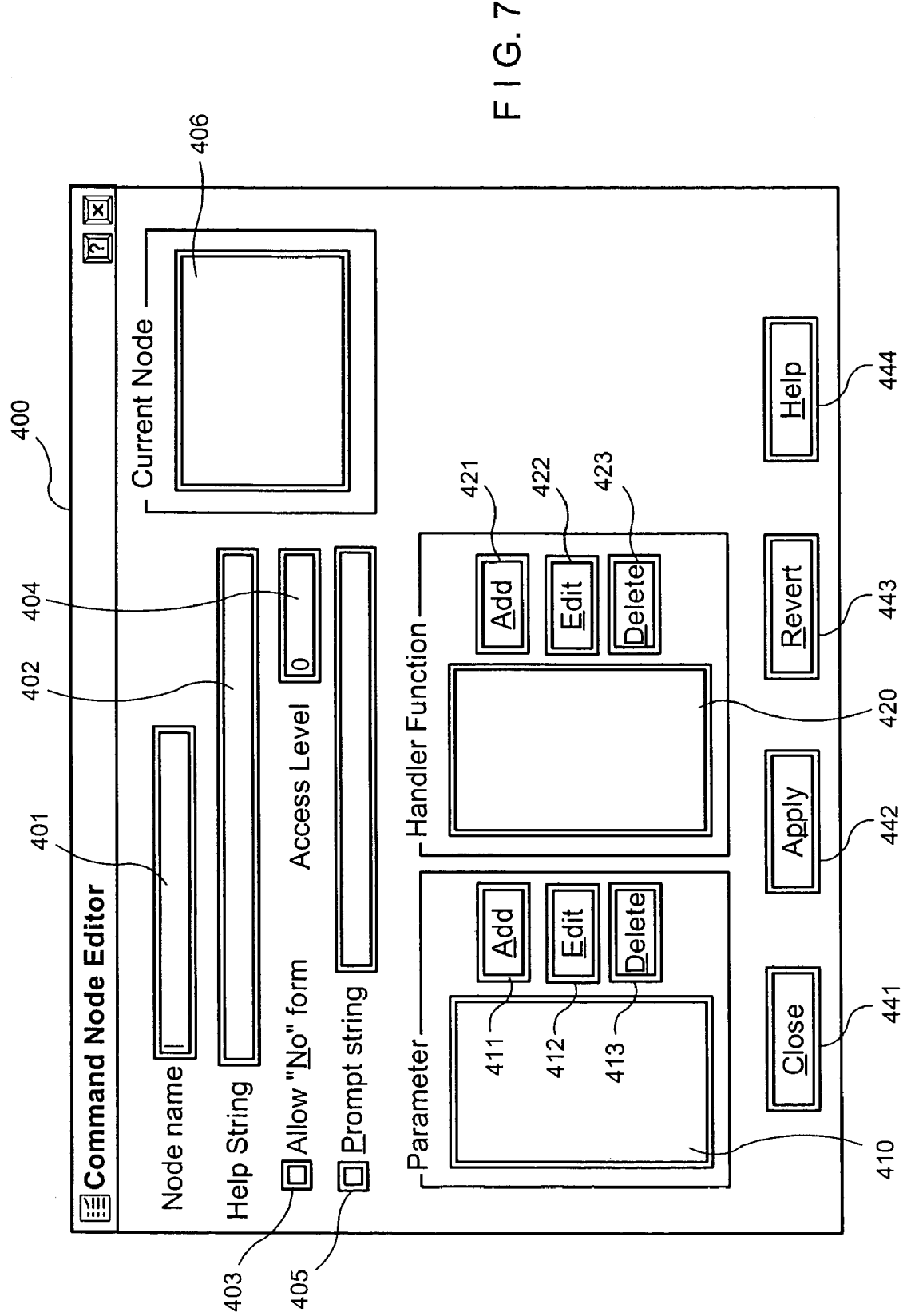
FIG. 7 shows an exemplary graphical user interface for the command node editor according to the present invention.

FIG. 7 shows an exemplary GUI 400 for command node editor 120. Those of skill in the art will understand that GUI 400 is only exemplary and that the GUI for command node editor 120 may include more or less fields than those described with reference to FIG. 7. The first information that may be provided by the developer about the new command node may be the name of the command node which is entered in field 401 of GUI 400. The developer may then enter a help string for the new command in filed 402 of GUI 400. A help string is a short text message a user may access when using the operating system. For example, for command0 node 210, the developer may have entered a help string in field 402 as follows: "help string for command0". Thus, when a user types "help command0" in the CLI, the text message "help string for command0" would appear to the user. Other information about the new command node that may be entered via GUI 400 includes an indication as to whether to allow no form handling in field 403 which is the ability to recognize and handle the negative form of the new command (e.g., no command0), the access level required for access to the new command in field 404 (e.g., "0" indicates that all users may access the command) and the prompt string in field 405. Using the example of the developer adding command0 node 210, the developer may fill in "command0" in field 401, the help string described above in field 402 and the desired settings in the fields 403–405.

The current nodes field 406 of GUI 400 describes the family or command structure branch to which the new command node belongs. This field is not filled in by the developer, but is automatically filled in based on the location selected for the new command by the developer in step 310. For example, if GUI 400 of command node editor 120 were open for command0 node 210, current nodes field 406 would be empty because command0 node 210 is a child of root node 205. However, if GUI 400 of command node editor 120 were open for struct node 262, set node 260 would appear in current nodes field 406 indicating that struct node 262 is a child of set node 260.

When the above data is entered into the new command in step 320 via GUI 400, the process continues to step 330, where the parameters are entered for the new command. The entering of parameters is also accomplished via GUI 400 by adding the desired parameters to parameter field 410. Similarly to the addition of a new command, the parameters may be added via a GUI associated with parameter editor 140. GUI 400 is shown having no parameters in parameter field 410. However, a developer may add parameters to the new command by clicking on add button 411. Those of skill in the art will understand that a command node is not required to have a parameter. Thus, step 330 may be considered an optional step in that the developer may not elect to add any parameters to the new command. In such a case, parameter field 410 on GUI 400 will remain empty.

Figure 8:
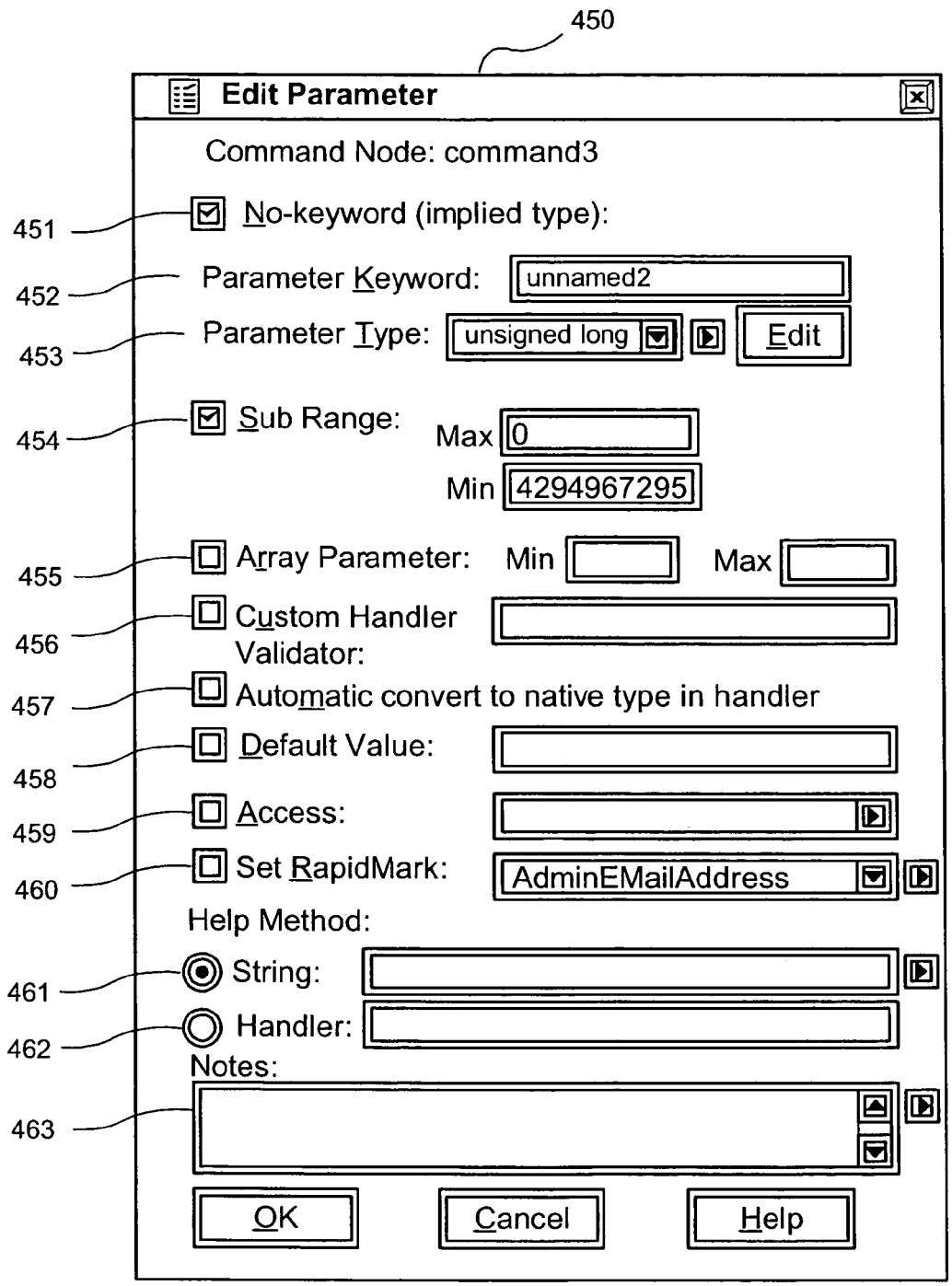
FIG. 8 shows an exemplary graphical user interface for the parameter editor according to the present invention.

FIG. 8 shows an exemplary GUI 450 for parameter editor 140. The action of clicking on add button 411 may bring up GUI 450 which may be used by the developer to add a parameter to the new command. Those of skill in the art will understand that GUI 450 is only exemplary and that the GUI for parameter editor 140 may include more or less fields than those described with reference to FIG. 8. GUI 450 may indicate the command node with which the parameter is associated (e.g., command3 node 240 in the example shown in FIG. 8). The developer may then fill in the information for the parameter via GUI 450. No keyword field 451 of GUI 450 indicates whether the parameter will have a keyword or name. A no keyword parameter is an implied type parameter that will remain unnamed. For example, there may be a command "reboot" with a parameter named "timeout". When a user types "reboot timeout 5" on the CLI, it indicates the command of "reboot", the parameter "timeout" and the value "5" for the parameter, which causes the device to reboot after the timeout period of 5. However, it is also possible to leave the parameter as unnamed. In this case, the user may enter "reboot 5" on the CLI, which will also cause the device to reboot after the timeout period of 5 because 5 is an implied timeout parameter. If the parameter is not an implied type (i.e., no keyword field 451 is not checked), the developer will fill in a name for the parameter in parameter keyword field 452. The developer will also select the type of parameter in parameter type field 453 (e.g., unsigned long, integer, string, boolean, etc.). The developer may then also fill in fields 454–461 as appropriate for the particular parameter that is being added.

When the parameter is configured to the satisfaction of the developer, the OK button may be clicked taking the developer back to GUI 400 of command node editor 120. The newly added parameter will then be shown as a parameter for the new command node in parameter field 410 of GUI 400. Those of skill in the art will also understand that the parameters for a command node may be edited by pressing edit button 412 and may be deleted by pressing delete button 413. Edit button 412 may cause GUI 450 of parameter editor 140 to reappear, whereupon the developer may edit any of fields 451–461. It is also possible for the developer to add multiple parameters to the command node. For example, referring to GUI 200 in FIG. 4, command3 node 240 has two parameters, unnamed1 parameter 241 and unnamed2 parameter 242.

Referring back to FIG. 6, when the insertion of parameter information in step 330 is complete, the process continues to step 340, where the handler functions are entered for the new command. Similar to the entering of parameters, the entering of handler functions is also accomplished via GUI 400 by adding the desired handler functions to handler function field 420. The handler functions may be added via a GUI associated with handler editor 130. GUI 400 is shown as having no handler functions in handler function field 420, but a developer may add handler functions to the new command by clicking on add button 421. Those of skill in the art will understand that a command node is not required to have a handler function. Thus, step 340 may be considered an optional step in that the developer may not elect to add any handler functions to the new command. In such a case, handler function field 420 on GUI 400 will remain empty. Delete button 413 may cause handler function field 420 to be updated if deleted parameters are associated with any handler functions.

Figure 9:
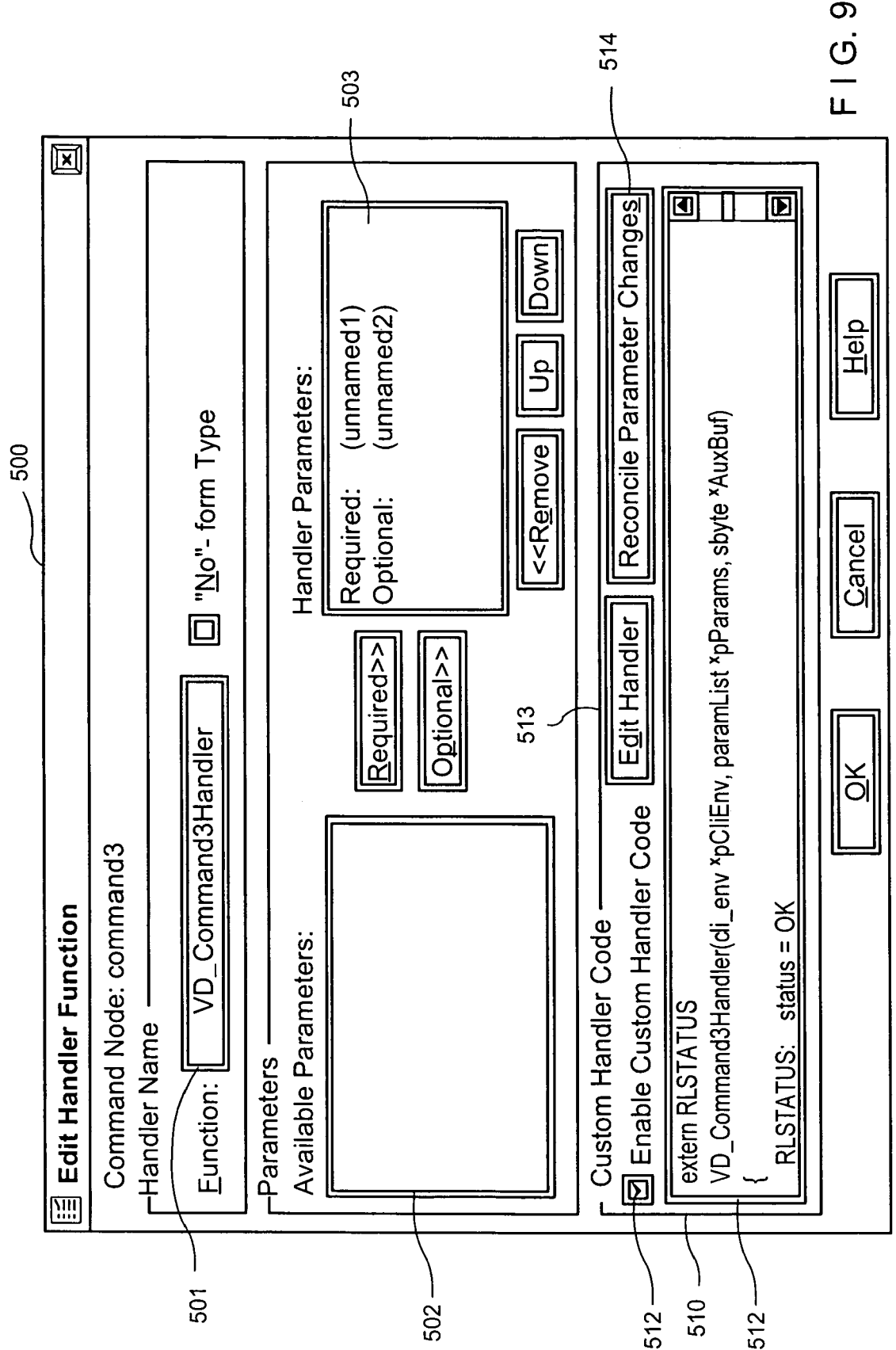
FIG. 9 shows an exemplary graphical user interface for the handler editor according to the present invention.

FIG. 9 shows an exemplary GUI 500 for handler editor 130. The action of clicking on add button 421 may bring up GUI 500 which may be used by the developer to add a handler function to the new command. Those of skill in the art will understand that GUI 500 is only exemplary and that the GUI for handler editor 130 may include more or less fields than those described with reference to FIG. 9. GUI 500 may indicate the command node with which the handler function is associated (e.g., command3 node 240 in the example shown in FIG. 9). The developer may then fill in the information for the handler function via GUI 500. The developer may fill in the name of the handler function in handler name field 501 (e.g. VD_Command3Handler). A list of the available parameters will be shown in available parameter field 502. The list of available parameters will be those added by the developer in step 330 of the current command node and/or parameters in one of the parent command nodes of the current command node (i.e., parameters from any command node that is at a higher level in the same command structure branch are available to the current command node). Thus, any parameter that is added to a command node, will also be available for any child command nodes of the command node to which the parameter is added. If the parameter listed in available parameter field 502 is not associated with the current command node, but rather with a parent command node, the developer will be aware of this because it will be shown named with the command node with which it is associated. For example, an exemplary command node named command5 may have a parameter unnamed1 and a second exemplary command node named command5child, which is a child of command5, may have a parameter unnamed 1. GUI 500 of handler editor 130 when opened for a handler function of command5child may show the list of available parameters in available parameter field 502 as:

unnamed1 command5 =>unnamed1

This listing of parameters indicates that "unnamed1" is associated with command5child, while "command5=>unnamed1" is associated with command5, but available to command5child because it is a child of command5.

The developer may select any of the parameters in available parameter field 502 by highlighting the desired parameter. The developer may then determine whether the parameter will be a required parameter or an optional parameter by pressing required button 504 or optional button 505, respectively. When the developer selects a parameter from available parameter field 502 and presses one of buttons 504 and 505, GUI 500 shows the selected parameter in handler parameter field 503. In the example of FIG. 9, parameter unnamed1 is shown in handler parameter field 503 as a required parameter, while parameter unnamed2 is shown as an optional parameter. A required parameter is one that is required to be typed in with the command on the CLI for the operating system to execute the command. An optional parameter is one that may be typed in with the command on the CLI, but the operating system may still execute the command without the typed parameter. For example, referring to FIG. 4, handler function VD_SetSysNameHandler 265 of command node sysName 263 has a required parameter unnamed1. Those of skill in the art will understand that it is not necessary to select a parameter for every handler function. For example, although available parameter field 502 may list multiple parameters available to the handler function, the developer may not desire to associate any parameter with the particular handler function. In this case, the developer would not select any parameter from available parameter field 502. GUI 500 also has custom handler code field 510 which includes enable button 511, code view field 512, edit handler button 513 and reconcile parameter changes button 514. Custom handler code field 510 will be described in greater detail below.

When the handler function is configured to the satisfaction of the developer, the OK button may be clicked taking the developer back to GUI 400 of command node editor 120.

The newly added handler function will then be shown as a handler function for the new command node in handler function field 420 of GUI 400. Those of skill in the art will also understand that the handler functions for a command node may be edited by pressing edit button 422 or deleted by pressing delete button 423. Edit button 422 may cause GUI 500 of handler editor 130 to reappear, whereupon the developer may edit any of fields 501–503. It is also possible for the developer to add multiple handler functions to the command node. In the case of multiple handler functions, the operating system may call the appropriate code for each of the handler functions when executing the command.

Referring back to FIG. 6, when the handler functions are inserted in step 340, the process continues to step 350 where the command structure is generated by command structure generation engine 145 using the information entered by the developer. Referring to FIG. 7, the developer initiates the generation process by pressing apply button 442 on GUI 400 which saves the information entered by the developer and generates the file described above. GUI 400 also has close button 441, revert button 443 and help button 444. Those skilled in the art will understand that these buttons operate in a standard manner. The command structure may be an include file with the following structure:

```
cmdNode mRootChildren[] =
{
    {"command0", kCommand0Help, NULL, 0, FALSE, 0, NULL, 0, NULL, 1,
        mCommand0Handlers},
    {"command1", kCommand1Help, NULL, 0, FALSE, 0, NULL, 1,
        mCommand1Params, 1, mCommand1Handlers},
    {"command2", kCommand2Help, NULL, 0, FALSE, 0, NULL, 1,
        mCommand2Params, 1, mCommand2Handlers},
    {"command3", kCommand3Help, NULL, 0, FALSE, 0, NULL, 2,
        mCommand3Params, 1, mCommand3Handlers}
};
cmdNode mRootCmdNode = {NULL, NULL, NULL, 0, FALSE, 4,
mRootChildren, 0, NULL, 0, NULL};
```

This code describes the root node (i.e., mRootCmdNode) and four child nodes (i.e., command0, command1, command2 and command3). As described above, each node may have information associated with the node that may be defined by the developer. Command structure generation engine 145 takes the information entered by the developer and generates the file that may be stored as the command structure. The exemplary code above may include the following information: keyword or name, help string, mode definition, access level, no form allowed, number of children, pointer to array of children, number of parameters, pointer to the array of parameters available to the node, number of handler functions attached to the node and a pointer to the array of handler functions. For example, root node mRootCmdNode is defined at the bottom of the code. The root node has no keyword or name (NULL), no help string (NULL), no mode definition (NULL), an access level of "0", the no form is not allowed (FALSE), the number of children is "4", the pointer to the array of children is "mRootChildren", no associated parameters (0), no pointer to an array of parameters (NULL), no handler functions (0), and no pointer an array of handler functions (NULL).

The upper portion of the code describes the children of the root node. As described above, in this example, the root node has four children and a pointer to the array of command nodes mRootChildren. To carry through with the example, the code with respect to command3 will be described. This node has a name (command3), a help string variable (kCommand3Help), no mode definition (NULL), an access level of "0", the no form is not allowed (FALSE), no children (0), no pointer to an array of children (NULL), two associated parameters (2), the pointer to the array of parameters is "mCommand3Params, one handler function (1), and the pointer to the array of handler functions is "mCommand3Handlers." In the case of the help string variable the variable may be initialized in a portion of the code not shown to the string entered by the developer (e.g., #define kCommand3Help "\help string for command 3\"). Those of skill in the art will understand that the code for the remainder of the child commands is similar to that of command3.

The process then continues to step 360 where the handler function definitions and parameter definitions are generated by command structure generation engine 145. Similar to the command structure, command structure generation engine 145 takes the information input by the developer and generates a file containing the information for the handler functions and parameters. This file may be the same file as that generated for the command structure or a separate file may be generated. An exemplary file generated for the parameter definitions may be as follows:

```
paramDefn mCommand3Params[] =
{
    {"param1", kstring, 0x00000001, 1, 0, NULL},
    {"param2", kstring, 0x00000002, 2, 0, NULL}
};
```

This code describes an exemplary parameter definition array mCommand3Params for command3. As described above, command3 has two parameters and a pointer to the array mCommand3Params for the parameters. As described above, the developer may have entered information for each of these parameters in, for example, GUI 450. Command structure generation engine 145 takes the information entered by the developer and generates the parameter definition file. The exemplary code above may include the following information: keyword or name, data type (e.g., integer, boolean, etc.), a unique bitmask identifier, relative position to a given sequence of parameters, flags, and a pointer to a structure that may have more detailed information on the parameter. For example, referring to the exemplary line of code for param1, the name of the parameter is param1, the data type is kstring, the unique bitmask identifier is 0x00000001, its relative position is one compared to the other parameters (e.g., param2), there are no flags set (0) and there is no pointer to another structure (NULL). Those of skill in the art will understand that the code for param2 may be similar to that of param1.

this software code causes the operating system to carry out the particular command typed by the user in the CLI. Handler code generation engine 135 automatically generates this software code using the information entered by the developer and the parameter and handler function definitions generated by command structure generation engine 145. The code generated by handler code generation engine 135 may be as follows:

```
extern RLSTATUS
VD_Command3Handler (void *pCliEnv, struct paramlist *pParams, sbyte *pAuxBuf)
{
    RLSTATUS   status = OK;
    sbyte      *pVal1;
    paramDescr *pParamDescr1;
    sbyte      *pVal2 = NULL
    paramDescr *pParamDescr2;
    /* get required parameter */
    RCC_DB_RetrieveParam (pParams, "param1", 0x00000001, &pParamDescr1);
    pVal1 = (sbyte*) (pParamDescr1->pValue);
    /* get optional parameter */
    status = RCC_DB_RetrieveParam (pParams, "param2", 0x00000002,
            &pParamDescr2);
    if (OK == status)
    {
        pVal2 (sbyte*) (pParamDescr2->pValue);
    }
    /* TO DO: Add your handler code here */
    return status;
}
```

30

An exemplary file generated for the handler function definitions may be as follows:

```
handlerDefn mCommand3Handlers[] =
    {
        {0, 0x00000001, 0x00000002, VD_Command3Handler}
    };
```

This code describes an exemplary handler function definition array mCommand3Handlers for command3. As described above, command3 has one handler function and a pointer to the array mCommand3Handlers for the one handler function. As described above, the developer may have entered information for the handler function in, for example, GUI 500. Command structure generation engine 145 takes the information entered by the developer and generates the handler function definition file. The exemplary code above may include the following information: the type of command (e.g., can this command handle "No" forms), the bitmask of required parameters, the bitmask of optional parameters and the actual handler function associated with the definition. For example, referring to the exemplary code for the command3 handler function, the command type is "0" meaning that it cannot handle the "No" form, the bitmask of param1 is identified as a required parameter (0x00000001), the bitmask of param2 is identified as an optional parameter (0x0000002) and the actual handler function is identified as VD_Command3Handler. The actual handler function will be described in greater detail below.

The process then continues to step 370 where the handler function code is generated by handler code generation engine 135. As described above, the handler function has associated software code associated therewith. Executing Those skilled in the art will understand that this exemplary software code carries through with the example started above and may be exemplary code generated by handler code generation engine 135 for handler function VD_Command3Handler for command3. This function is given a pointer to a paramList structure which is a listing of all the parameters received by the command upon being called and paramDescr structure. Since both the paramList and paramDescr structures may change during the course of development, an abstract manner of getting the values associated with a parameter is provided. This manner is provided by the function RCC_DB_RetrieveParam() function. To access the value in a given parameter using this function, all that is needed is the paramList that the handler receives, a set of parameter identifiers (e.g., keyword and/or bitmask identifier) and the address of a pointer to a paramDescr structure. If the RCC_DB_RetrieveParam() function can find the parameter based on the keyword or bitmask identifier, then it initializes the parameter description to point to the relevant parameter within the parameter list. Referring to the portion of the code associated with the optional parameter (i.e., the portion of the code under the comment line "/* get optional parameter */"), the parameter is identified by both keyword (param2) and bitmask (0x00000002). If the optional parameter was entered in the CLI by the user, the parameter description (pParamDescr2) is initialized to point to the relevant parameter within the parameter list (pValue). The generated code for a required parameter (i.e., the portion of the code under the comment line "/* get required parameter */") does not need to contain error checking to determine whether it received the parameter because the handler function would not be called unless the parameter was there. This code may be viewed as it is being generated in code view field 512 of GUI 500 as parameters are being added to the handler function.

Once the value has been set for a parameter, the handler function may use the value in any manner that the developer desires. For example, the developer may desire that the parameter value be displayed to the user. To carry out this function, the developer may add additional lines of code to the handler function. Handler code generation engine 135 provides for this by indicating in the generated code where the developer may insert additional code to accomplish functions desired by the developer. For example, the exemplary generated code described above includes a comment line "/* TO DO: Add your handler code here */" indicating where in the automatically generated code, a developer may enter additional code. This portion of code may be generated in response to the developers checking of enable button 511 of GUI 500. By checking enable button 511, the developer indicates that he may desire to add custom handler function code to the automatic code generated by handler code generation engine 135. When the developer desires to add this custom code to the handler function, he may press edit handler button 513 and a new GUI containing the code may appear on the display on which the developer may edit the automatically generated code.

FIG. 11 shows an exemplary GUI 600 for the handler code generation engine 135. GUI 600 displays the code generated by handler code generation engine 135 so that the developer may view, review and accept the automatically generated code. In the example of FIG. 11, GUI 600 is displaying the same automatically generated code for the handler function VD_Command3Handler of command3 as was discussed in detail above. The developer may also use GUI 600 to add any additional lines of code the developer desires to add to the handler function.

Those skilled in the art will understand that it may also be possible to include additional information on the GUI screens so that additional handler code may be generated automatically. For example, on GUI 450 of parameter editor 140, it may be possible to include a field for the developer to input information as to whether the parameter value should be displayed to the user if the command is invoked. If such a field is included, the handler function code automatically generated by handler code generation engine 135 will include the lines of code to display the parameter value. The developer would not have to add more code to accomplish this function because it would be generated automatically.

Automatic code generation saves the developer time in implementing new commands and results in a more modular form of the software code for the operating system. For example, multiple developers may be implementing various command sets into an operating system. By using the automatic code generation feature, these developers will not need to type in as many lines of code by hand for the handler functions. In the process of setting up the commands, the handler functions and the parameters through the visual tools (e.g., the GUIs) provided by command node editor 120, handler editor 130 and parameter editor 140, respectively, the developers are also entering all the required information to automatically generate the handler function code. Thus, the setting of commands, handler functions and parameters and the generation of the handler function code is coordinated. Additionally, since handler code generation engine 135 generates code automatically, each developer will be utilizing the same code to accomplish the same functions within different commands. Therefore, when a developer looks at the code for different commands, the structure of the code and common functions will be exactly the same, allowing for easy troubleshooting and transportability of the code.

When a new command is entered by the developer, command structure generation engine 145 will add additional code to the command structure to incorporate the information added by the developer using the visual tools (e.g., the GUIs) provided by functions 110–140. Additionally, handler code generation engine 135 uses the information added by the developer and the information generated by command structure generation engine 145 to automatically build the handler function code. After the process of FIG. 6 has been completed, a user of the system may access the new command that was inserted by the developer.

Referring back to FIG. 4, GUI 200 also has "−"button 202 which may be used to delete a command node. For example, the developer may highlight the command node to be deleted and then presses "−"button 202 to delete the command node. When a command node is deleted, all its child command nodes may also be deleted. For example, if the developer desires to delete set node 260, child nodes 261–263 may also be deleted. Thus, there may be a prompt or a message given to the developer to make sure that the developer wants to delete the command node and all its child nodes before the delete function is carried out.

GUI 200 may also be used to edit command nodes and the location of command nodes in the command structure. For example, if the developer desires to edit command0 node 210, the developer may highlight command0 node 210 and press edit button 203. This may cause GUI 400 of command node editor 120 to appear to the developer so that it may be edited by the developer. Similar to the creating of a command node, GUI 400 allows any of the fields to be edited, including the addition, deletion and editing of parameters and handler functions. When the edits are completed, the developer may press apply button 442 of GUI 400 and the edits are saved for the command node. When a command node is edited, command structure generation engine 145 and handler code generation engine 135 may also be invoked to edit the command structure, the handler function definitions, the parameter definitions and the handler function code based on the changes made to the command node, parameters and handler functions by the developer. As described above, the command structure, the handler function definitions, the parameter definitions and the handler function code is automatically generated based on the information provided by the developer and therefore may need to be revised based on any changed or additional information provided by the developer. For example, referring to FIG. 9, GUI 500 has a reconcile parameter changes button 514. When a developer edits parameters in a handler function through GUI 500, the developer may press button 514 and these changes will be automatically reconciled in the handler function code by handler code generation engine 135. Those of skill in the art will understand that in the case of the handler function code, a developer may write additional lines of code to incorporate any other functionality in addition to the base functionality provided by handler code generation engine 135. In this case, handler code generation engine 135 may provide a function that any code that was previously added by the developer may be transported or copied to the new handler function code that is generated as a result of edits to the command node by the developer.

In the case of editing the location of a command node, GUI 200 may be used to drag and drop a command node from location to another. For example, it may be possible to highlight command0 node 210 and drag it so that it becomes a child of command2 node 230. In this case, GUI 400 may appear to the developer because some of the fields may have to be edited due to the change of location of the command node. Similarly, the developer may copy a command node by highlighting the particular command node and pressing a copy button available to the developer. The developer may then paste the contents of the copied command node to a new node in a location selected on GUI 200. This would copy the contents of an entire node to a new node which the developer may then edit.

Figure 10:
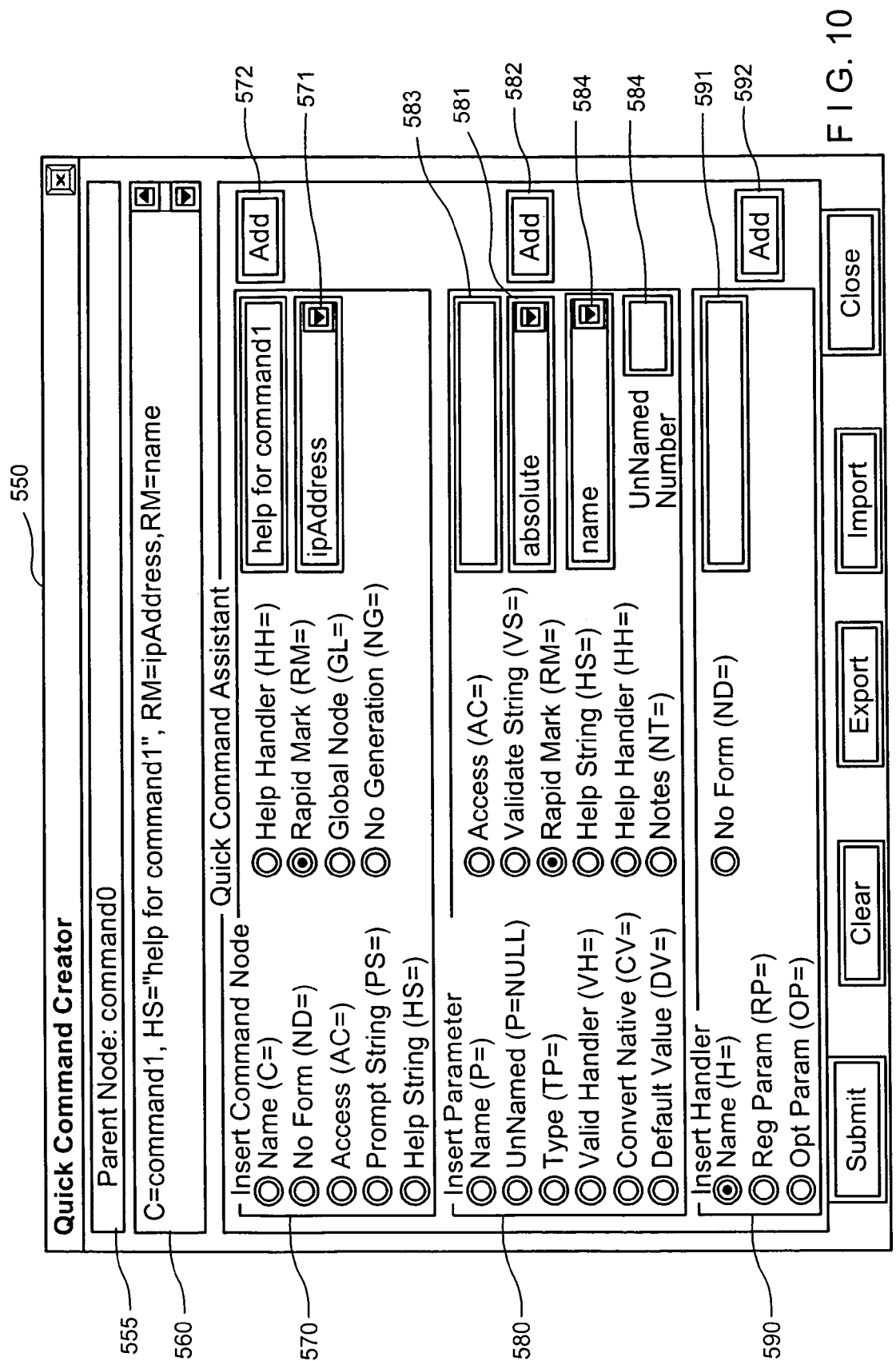
FIG. 10 shows an alternative exemplary graphical user interface for the functions according to the present invention.

FIG. 10 shows an alternative exemplary GUI 550 for functions 120–140. GUI 550 incorporates interfaces for each of command node editor 120, handler editor 130 and parameter editor 140. GUI 550 may be entered in the same manner as GUI 400 of FIG. 7 (e.g., the developer desires to add a new command node to command structure manifest 110). In parent field 555, the operating system enters the name of any parent command nodes. In the example of FIG. 10, the command node being added is a child of command0. If the command being added is a child of the root command node, parent field 555 would remain blank. If the new command node has a grandparent, the entire branch of the command structure to which the new command mode is a member will be displayed in parent field 555. Code field 560 displays the information that has been added to the command. The text that is displayed is normally what the developer would need to enter to create the command. However, in this case, the text is automatically generated when the developer uses GUI 550 to build the command. In the example of FIG. 10, the following text is in code field 560:

C=command1, HS="help for command1"

This text indicates that the name for the command (e.g., C=) is command1 and the help string for the command (e.g., HS=) is "help for command1." The details of how this code was generated are described below.

Insert command node field 570 has a listing of information that may be included in the command node. This information is similar to the information shown in GUI 400 of FIG. 7. The developer may highlight the information to be added and then add the information in text field 571. For example, the developer may highlight the Name information box (e.g., Name (C=)) and then enter the name of the command in text field 571. To build the text in code field 560 shown in FIG. 10, the developer would enter "command1" in text field 571 and then press add button 572. The system would then generate the text "C=command1" in code field 560. Similarly, the developer would then highlight the Help String information box (e.g., Help String (HS=)) and enter "help for command1" in text field 571.

Insert parameter field 580 operates in a similar manner to insert command node field 570. The developer may highlight the information to be added and then add the information in one of text fields 581 and 584. Pressing add button 582 saves the information for the parameter. Those skilled in the art will understand that one or both of text fields 581 and 584 may also convert into a pull down menu when the type of information to be added is a limited set of data. For example, when adding the parameter type (e.g., Type (TP=)), the type of data to be added may be limited to particular types of parameters (e.g., unsigned long, integer, string, boolean, etc.). Therefore, text field 581 may convert to a pull down menu listing these types of parameters and the developer may select the parameter type from the pull down menu. Insert parameter field 580 may also have name field 583 which indicates the name of the parameter currently being added. Since a command node may have multiple parameters, the developer may desire to see the name of the parameter on which work is currently being performed. Similarly, insert parameter field 580 may also have unnamed field 585 to indicate the number of the unnamed parameter on which work is currently being performed.

Insert handler field 590 also operates in a similar manner to insert command node field 570. The developer may highlight the information to be added and then add the information in text field 591. Pressing add button 592 saves the information for the handler function. When the developer highlights the required or optional parameter information box, text field 591 may convert to a pull down menu with the available parameters. The developer may then select the desired parameter from this list of available parameters from the pull down menu in text field 591.

When all the desired information for the new command node is complete, the developer may press the submit button and the information will be saved and the automatic files will be generated (e.g., command structure, handler function definition, parameter definition, handler function code) for the new command node which will be inserted into command structure manifest 110. GUI 550 may be considered to include all the functionality of GUI 400, GUI 450 and GUI 500. GUI 550 may also be used to edit command nodes, parameters and handler functions.

Figure 15:
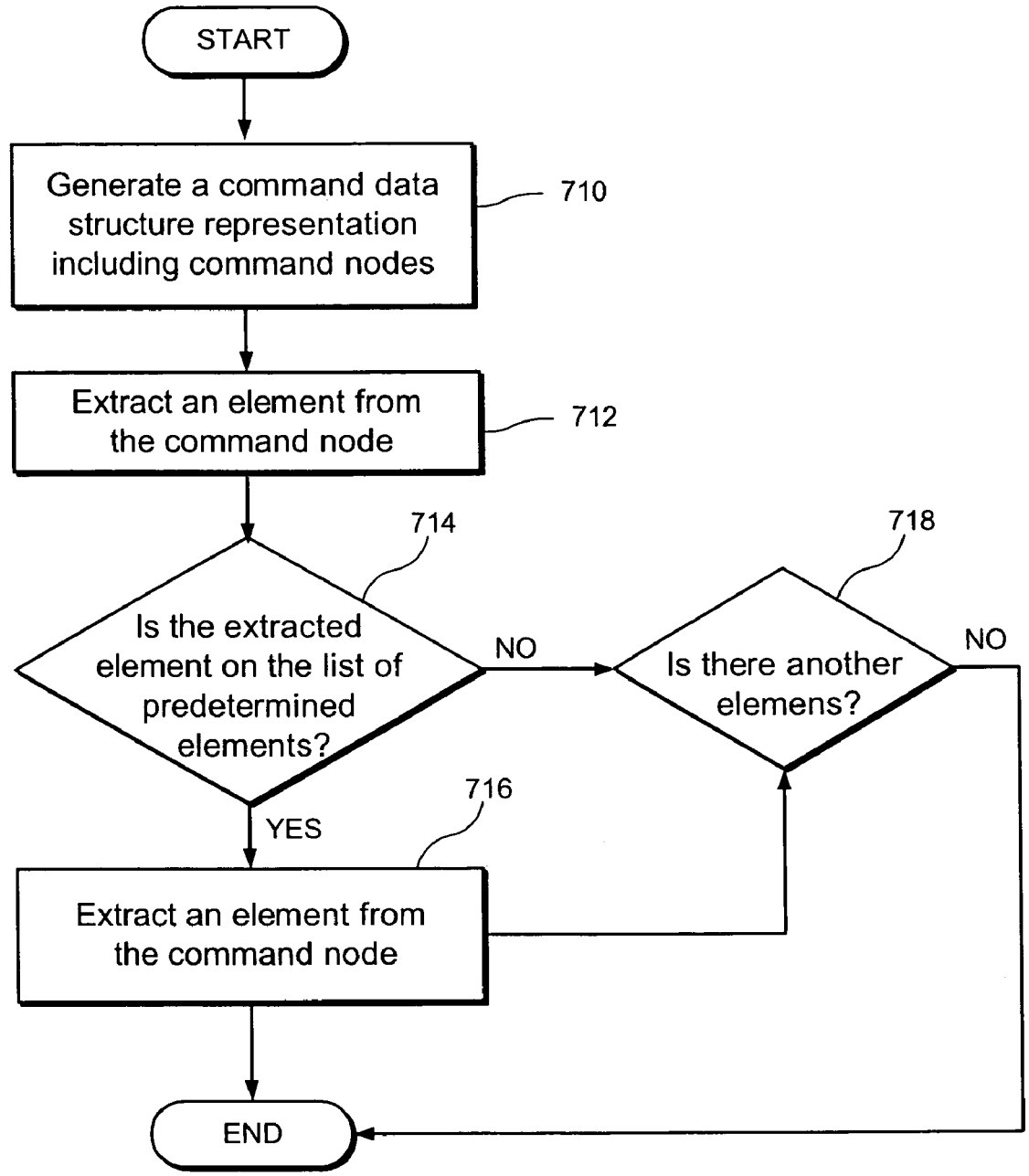
FIG. 15 shows an exemplary method for utilizing the command data structure representation according to the present invention.

Those skilled in the art will understand that such command data structure representation allows a number of high level actions/operations to be performed upon the data file/codes. These operations may be, for example, automatically carried out synchronous to the update and/or code generation, thus easing the burden of keeping all data correct and current. For example, the present invention may be utilized for generating a documentation manual or for translating commands into a foreign language. FIG. 15 shows an exemplary embodiment of a method for utilizing the command structure representation. In step 710, the command data structure may be generated according to the exemplary method described above and shown in FIGS. 1 through 11.

FIG. 12 shows a GUI 700 which displays an exemplary embodiment of a command node 705. The command node 705 is represented using an XML language format. Those skilled in the art would understand that the command node 705 may be represented using other language or data structure formats. The command node 705 may include a command node header 701 which may include supplemental information about the command node 705 (e.g., a keyword, a help string, etc.). In addition, the command node 705 may include a parameter list 703, a handler list 704 and a command node list 704. The command node list 704 may include sub-command nodes where each sub-command node has the same format as the presented command note for the command node 705. As discussed above, this code may be automatically generated based on the information entered by a user.

Figure 14:
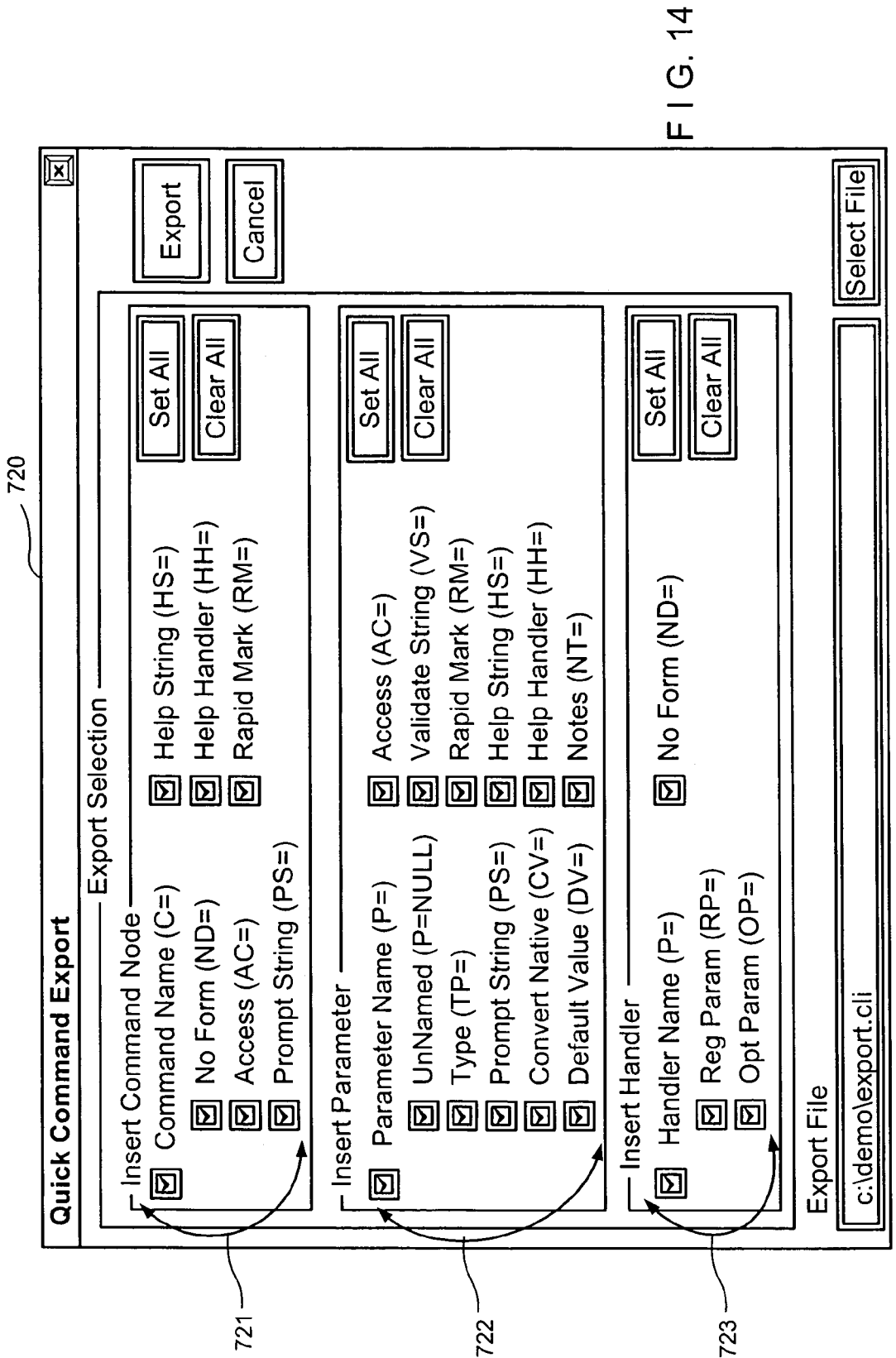
FIG. 14 shows an exemplary graphical user interface which allows a user to indicate a list of desired elements.

In step 712, shown in FIG. 15, an element is extracted from the command node 705. The extracted element is reviewed to determine if such element is one of the predetermined elements (step 714). A list of the predetermined elements may be generated by a user. For example, FIG. 14 shows a GUI 720 which allows the user to indicate desired elements to be extracted. The GUI 720 may include a plurality of types of elements that can be extracted. For example, the user may want to extract one of the header elements 721, parameter elements 722 or handler elements 723. For instance, the user may indicate that he wants to extract all help strings and help handlers to generate a help file. Alternatively, the user may want to extract certain parameters necessary to create a documentation manual. Furthermore, the user may indicate a type of output desired to review the extracted elements.

In an alternative exemplary embodiment of the present invention, the list of predetermined elements may be generated by a program or subroutine. For example, a particular program may periodically need to examine certain parameters of the command node 705 in order to update it. Thus, this program may generate the predetermined list of the desired elements which will be extracted from the command node 705. Utilization of the data structure representation provides an efficient way for indication and extraction of the desired elements.

If the element is not included on the predetermined list of desired elements, then the command node 705 is examined to determine if it has another element (step 718). If such element exists, then steps 712 though 718 are repeated. A user may specify an order of extraction of the elements. For example, elements may be extracted from the top to the bottom of command node 705, or vice versa.

On the other hand, if the element is included in the predetermined list, then a set of predefined actions is performed upon the extracted desired element (step 716). For instance, the set of predetermined actions may include collection of all relevant help information and generation of a help manual. In addition, the set of predefined actions may be executed simultaneously with extraction of the desired element or after all of the desired elements are extracted.

The predefined actions may generate an output file in a human readable format. FIG. 13 shows a GUI 730 including an exemplary output file. This output file is generated based on the command node 705 shown in FIG. 12 and includes data having a similar structure as the command node 705. For example, the output file includes a command node header 731, a parameter list 732 and a handler list 733 which correspond to information stored in the command node header 701, the parameter list 702 and the handler list 703. Based on such a output format, the user may easily generate, for example, a documentation manual.

Another way to utilize the command structure representation is to extracted certain elements in order to translate them into a foreign language and then insert them back into the same command structure. Alternatively, the command structure may be utilized to extract elements that need to be periodically updated; these elements are then updated and inserted back into the same command structure. Those skilled in the art will understand that one of the advantages of the command data structure representation is that it allows command line elements and trees to be easily imported and shared with other projects, thus providing consistent functionality with the development of common libraries.

One of the advantages of the present invention is that the formatted command structure representation may have a format for the structured data such that new data fields may be added and old ones removed, and yet, the data as a whole is still readable by older programs from any computing platform. The formatted data file is also structured such that rules for formatting the data are included or implied so that the data can be validated (e.g., XML).

Another advantage of the present invention is that the command structure representation of the data file (e.g., as one shown in FIG. 12) needs to be prepared only once by a developer and it is capable of generating a plurality of output files by the method described in FIG. 15 for any desired computing platform or environment. In other words, the present invention allows a developer to change a cosmetic aspect of the command structure such as the text language while insuring the functional performance for each of the computing platforms is identical.

In the preceding specification, the present invention has been described with reference to specific exemplary embodiments thereof. It will, however, be evident that various modifications and changes may be made hereunto without departing from the broadest spirit and scope of the present invention as set forth in the claims that follow. The specification and drawings are accordingly to be regarded in an illustrative rather than restrictive sense.

What is claimed is:

1. A method executed on a computing device to perform an operation on extracted elements of a software code, wherein the software code includes a command node list, a parameter list, and a handler list, comprising the steps of:
   generating a list of desired elements of the software code, wherein the desired element is one of a command node element, a parameter element, and a handler function element;
   extracting an elements from the software code;
   determining whether the extracted element is on the list of desired elements; and
   performing an operation on the extracted element when the extracted element is determined to be on the list of desired elements, wherein the operation is one of generating a command data structure representation using the command node element, generating handler function definitions and parameter definitions using the handler function element and the parameter element, and generating a handler function code using the handler function element and the parameter element.

2. The method according to claim 1, wherein the software code is generated according to the following substeps:
   receiving at least one parameter element via a graphical user interface,
   receiving at least one handler function element via the graphical user interface, and
   automatically generating the first software code using the at least one parameter element and the at least one handler function element.

3. The method according to claim 1, wherein the list of desired elements includes a list of language translatable elements and wherein the performing step includes the following substeps:
   translating the extracted elements from a first language into a second language.

4. The method according to claim 3, wherein the performing step includes the following substep:
   inserting the translated elements back into the first code.

5. The method according to claim 3, wherein the performing step includes the following substep:
   generating a second code as a function of the first code and the translated elements.

6. The method according to claim 1, wherein the list of desired elements includes a list of help-related elements and wherein the performing step includes the following substeps:
   generating a help manual as a function of the extracted elements.

7. The method according to claim 1, wherein the list of desired elements is generated via a graphical user interface.

8. The method according to claim 1, wherein a graphical user interface displays the extracted elements.

9. The method according to claim 1, wherein the command data structure representation is a hierarchical command tree.

10. A system, comprising:
a first engine receiving a list of desired elements of a software code, wherein the software code includes a command node list, a parameter list, and a handler list;
a second engine extracting an element from the software code;
a third engine determining whether the extracted element is on the list of desired elements; and
a fourth engine performing an operation on the extracted element when the extracted element is determined to be on the list of desired elements, wherein the operation is one of generating a command data structure representation using the command node element, generating handler function definitions and parameter definitions using the handler function element and the parameter element, or generating a handler function code using the handler function element and the parameter element.

11. The system according to claim 10, further comprising:
a software code generation engine receiving at least one parameter element and at least one handler function element via a graphical user interface and automatically generating the software code using the at least one parameter element and the at least one handler function element.

12. The system according to claim 10, wherein the list of desired elements includes a list of language translatable elements and wherein the third engine translates the extracted elements from a first language into a second language.

13. The system according to claim 12, wherein the third engine inserts the translated elements back into the first code to generate a second code.

14. The system according to claim 10, wherein the list of desired elements includes a list of help-related elements and wherein the third engine generates a documentation manual as a function of the extracted elements.

15. The system according to claim 10, wherein the list of desired elements is generated by the first engine via a graphical user interface.

16. The system according to claim 10, wherein a graphical user interface displays the extracted elements.

17. The system according to claim 10, wherein the command data structure representation is a hierarchical command tree.

* * * * *